H. I. MORRIS.
TIRE HANDLING MACHINE.
APPLICATION FILED NOV. 18, 1916.
1,318,685. Patented Oct. 14, 1919.
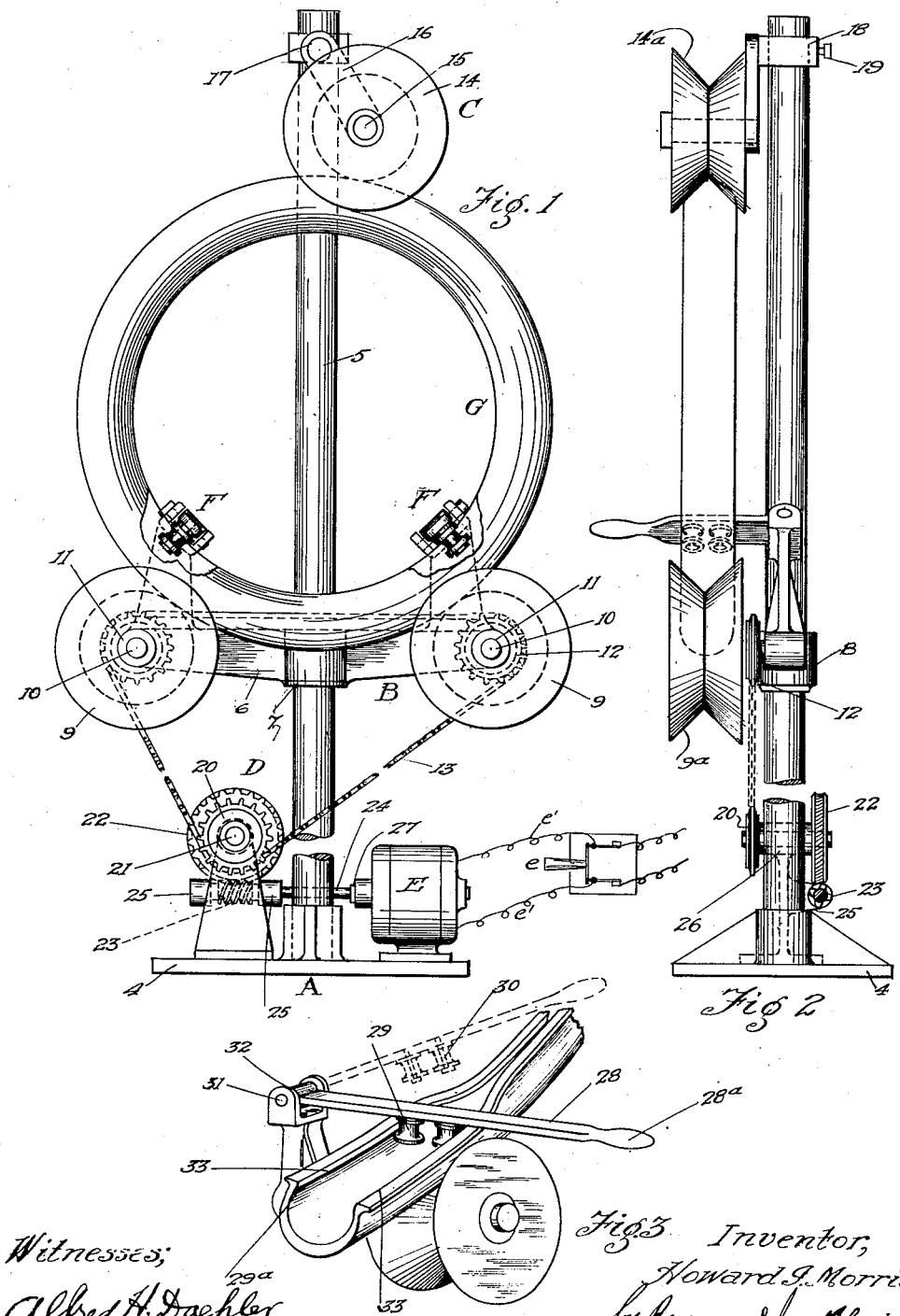
Witnesses:
Alfred H. Daehler
Sydney Clifton
Inventor,
Howard I. Morris,
by Raymond H. a Blakeslee,
his Attorney.

UNITED STATES PATENT OFFICE.

HOWARD I. MORRIS, OF SAN DIEGO, CALIFORNIA.

TIRE-HANDLING MACHINE.

1,318,685.  Specification of Letters Patent.  Patented Oct. 14, 1919.

Application filed November 18, 1916. Serial No. 132,162.

*To all whom it may concern:*

Be it known that I, HOWARD I. MORRIS, a citizen of the United States, residing at San Diego, in the county of San Diego and State of California, have invented new and useful Improvements in Tire-Handling Machines, of which the following is a specification.

This invention relates to tire handling machines, and the invention has for its object to provide a machine of the character stated for the handling of casings of pneumatic tires and the like during the operation of painting the interior thereof, such casings being ordinarily formed of a plurality of layers of rubber-impregnated fabric and rubber and are open only at the inner edge thereof, to the end that a pneumatic tube may be properly inserted in the casing and, due to the inherent tendencies of the casing, the lips or the beads thereon usually meet and close the opening through which the pneumatic inner tubes are inserted. In the manufacture of such casings, it is necessary or desirable to paint the interior thereof and it is a difficult and slow process to open the casings by hand as the painting proceeds.

In accordance with the present invention, a machine is provided in which a casing may be mounted and rotated and a section thereof opened to permit the insertion of a paint brush or the like and, such section after painting may be moved out of the zone of paint application and without cessation or interruption of the painting operation, the motion of the tire being continuous as the painting proceeds. Spreading means are inserted between the lips of the casing at the ends of the zone of paint application, and as the tire is rotated in the machine the portion between such means is open and the interior of such section of the tire may be easily painted.

In the preferred form of the invention, a plurality of power driven grooved rollers or wheels are provided to support the tire and transmit power thereto to rotate the same, a further idler wheel being applied to the tire to maintain the same in its plane of rotation during the period of operation, and such idler wheel may be readily moved to permit the removal of a tire and replacing of the same by another tire.

A further object of the invention is to provide a machine of the general character stated which will be relatively simple and inexpensive in construction and organization, positive in action, long of life, and which in practice greatly facilitates the painting of tires, and which will be generally superior in serviceability.

With the above and other objects in view, the invention consists in the novel and useful provision, formation, association and inter-relation of parts, members and features, all as hereinafter described, shown in the drawing, and finally pointed out in claims.

In the drawing:

Figure 1 is a fragmentary front elevation of a tire painting machine, a tire casing being shown in position therein for the painting operation;

Fig. 2 is a fragmentary side elevation of the machine shown in Fig. 1; and

Fig. 3 is an enlarged perspective view of fragments of the machine and a fragment of a tire illustrating the spreading action of the spreading means.

Corresponding parts in all the figures are designated by the same reference characters.

Referring with particularity to the drawing, in the embodiment of the invention therein shown, A designates a base or support, B designates means for supporting and rotating the casing of a pneumatic tire or the like, C designates releasable means for maintaining such casing in position, D designates drive means for the means B, and E designates a motor for actuating the drive means and causing the rotation of the tire casing.

The base or support A preferably comprises a suitable foundation plate 4 from which rises a vertical standard 5 and upon which is mounted the motor E shown as an electric motor.

The casing supporting and rotating means B is shown as comprising a horizontal member 6 fixed to the upright standard 5 as by seating the same on a collar or shoulder 7 provided on the standard 5, the standard 5 being shown as tubular and the member 6 being shown as provided with a boss 8 through which the upright or standard 5 is passed, and a pair of grooved wheels 9, one of which is rotatably mounted at each end of the horizontal member 6 so as to space the wheels, to the end that a casing may be supported by the pair of wheels 9 and in the grooves 9ª thereof, such wheels being mounted for rotation in a common preferably vertical plane. Each of the wheels 9 is mounted on its stub axle 10, such axles 10 projecting horizontally from the member 6, a suitable boss 11 being provided at each end of the horizontal member 6 each to receive an axle 10 and support the same. The wheels 9 may be rotatably mounted on the respective axles 10 and each of such wheels has secured thereto a sprocket 12 whereby through the agency of a chain 13 comprised within the drive means D, the wheels may be rotated.

The means C preferably comprises a grooved wheel or idler 14, a pivot 15 about which said idler is rotatable, and a link 16 supporting said pivot 15 at one of its ends and pivotally connected to the standard at the other of its ends as at 17, and at a suitable point above the means B. Means C may be adjusted along the standard to provide for the accommodation of casings of various sizes as by providing a collar 18 on the standard for the support of the means C through the pivot 17, and providing a set screw 19 in such collar the entire means C may be shifted along the upright standard 5 to any required position of adjustment. It will, of course be understood, that the groove 14ª of the idler 14 lies in the same plane as the groove 9ª of the wheels 9 and all such grooves are preferably formed with conical side walls so that a tire casing may be readily centered or properly disposed in its plane of rotation.

The drive means D is shown as comprising a sprocket 20 fixedly mounted on a shaft 21, the chain 13 which is rove about said sprocket 20 and both of the sprockets 12, a worm gear 22 fixedly mounted on the shaft 21, a worm 23 meshing with the worm gear 22 and mounted upon a shaft 24 which shaft is supported in suitable bearings 25 provided on the base A. The shaft 21 is mounted in a suitable bearing 26 supported by the base A. The motor E is shown as an electric motor connected at 27 with the shaft 25 so that a proper speed reduction may be obtained as between the motor E and the grooved wheels 9 so that proper speed of tire rotation may be had.

Spreading means F are provided for maintaining a section of the tire in open position, and two such means are shown one disposed adjacent each of the wheels 9. The tire is shown at G. Each of the spreading means F preferably comprises a lever 28 and a plurality of rollers 29 mounted on the lever 28 as by means of pivots 30. The lever 28 is provided with a hand grip at one end, as at 28ª and is pivotally supported at its other end as at 31 by means of a preferably bifurcated bracket 32, rising from the horizontal member 6 adjacent to the point of support of the respective wheel 9. The rollers 29 are preferably grooved as at 29ª and have their pivots disposed in vertical planes when in position for tire spreading. The lever 28 when in horizontal position properly supports the rollers 29 one in contact with each of the lips 33 of the pneumatic tire being painted and an open space is maintained in such tire for the entire distance between the two spreading means F. As the tire is rotated other portions of the tire are opened successively and automatically due to the movement of the successive portions of the tire past the opening or spreading zone. The lever 28 may be tilted upwardly and rearwardly to remove the same from contact with the tire and out of the plane of tire rotation.

A controlling switch e may be installed in the circuit wires e' supplying the motor E with electrical energy.

The operation, method of use and advantages of the invention will be readily understood from the foregoing description, taken in connection with the accompanying drawings and the following statement:

To paint or otherwise treat the interior surfaces of a pneumatic tire casing or the like, such casing is placed upon the grooved wheels 9 as shown in the drawings, the idler wheel 14 being raised to permit the placing of the tire in position or the tire may be rolled edgewise into position forcing said idler wheel 14 upwardly to the required height to properly position the tire, the grooved formation of the idler wheel 14 maintaining the tire in upright position. The levers 28 may then be brought forwardly and downwardly and by opening the casing, as by the hand of the operator, the rollers 29 on the levers 28 may be pressed into the casing and the inner edges of the casing sides allowed to enter the grooves of the grooved rollers 29 an open space being maintained between the two levers 28. Upon the application of power through the grooved wheels 9, through the drive means D, as by closing the electrical switch e, the tire casing may be rotated at the proper speed and paint or the like may be applied by means of a brush to the inner surfaces of the tire casing as such surfaces are presented to the zone of operation, namely the open space between the spreading means F. After the tire casing has been rotated and the surfaces painted or otherwise treated the tire casing may be removed by first throwing the levers 28 of the spreading means F upwardly and rearwardly, stopping the motor through its controlling switch e, and removing the tire casing. Successive tire casings may be placed in the machine and painted or otherwise treated. In some cases, the tire may be withdrawn from the machine by merely throwing the levers 28 rearwardly and out of the way and rolling the same off the wheels 9, another tire being inserted in the machine in its place by feeding the same edgewise into the machine, the idler portion 14, due to its link suspension, readily accommodating such insertion and removal of tires. The idler 14 may be positioned by its adjusting means or supporting collar 18 at the point required for the proper handling of any particular sized tire.

Having thus disclosed my invention, I claim and desire to secure by Letters Patent:

1. A tire handling machine comprising a support, spaced rotating tire engaging members mounted upon the support, means for holding the tire in spread condition for treatment of the interior surfaces thereof, and means for rotating certain of said tire engaging members; another of said tire engaging members being mounted so as to be capable of application to and removable from the tire; said support being provided with a pivotal mounting for said last named member accommodating such movement thereof.

2. A tire handling machine comprising a support, spaced rotating tire engaging members mounted upon the support, means for holding the tire in spread condition for treatment of the interior surfaces thereof, and means for rotating certain of said tire engaging members; another of said tire engaging members being adjustably mounted; said tire spreading means comprising a plurality of pivotally mounted members each provided with spaced rollers adapted to engage with the separate side portions of the tire.

3. In a machine of the character disclosed, means for supporting and rotating a tire, and spaced means for spreading the tire to permit treatment of the inner surfaces thereof; each said latter means comprising a pivotal member provided with spaced rollers adapted to be introduced within the tire and in engagement with the opposite side portions thereof.

4. In a machine of the character disclosed, means for supporting and rotating a tire, and spaced means for spreading the tire to permit treatment of the inner surfaces thereof; each said latter means comprising a member provided with spaced rollers adapted to be introduced within the tire and in engagement with the opposite side portions thereof; said member being pivotally mounted and provided with a handle portion projecting laterally of the tire.

5. A machine of the character disclosed, comprising a pair of spaced rotating tire supporting and guiding rollers, and a movably supported upper tire guiding roller mounted to be capable of application to and withdrawal from the tire, and means for rotating said first named rollers; means likewise being provided for introduction within the tire to separate the side portions thereof and permit access to the inner surfaces of the tire; said last named means comprising two members each of which is mounted for application to the tire in juxtaposition to one of such driven rollers.

6. A machine of the character disclosed, comprising a pair of spaced rotating tire supporting and guiding rollers, and a movably supported upper tire guiding roller mounted to be capable of application to and withdrawal from the tire, and means for rotating said first named rollers; means likewise being provided for introduction within the tire to separate the side portions thereof and permit access to the inner surfaces of the tire; said last named means comprising two members each of which is mounted for application to the tire in juxtaposition to one of such driven rollers and comprises a pivoted portion adapted to extend athwart the tire and provided with spaced rollers in direct engagement with the tire side portions.

In testimony whereof, I have signed my name to this specification in the presence of two subscribing witnesses.

HOWARD I. MORRIS.

Witnesses:
C. P. TURNER,
CLAUS SPRECKELS.